(12) United States Patent  
Nagar et al.

(10) Patent No.: US 11,106,915 B1  
(45) Date of Patent: Aug. 31, 2021

(54) GENERATING IN A GAZE TRACKING DEVICE AUGMENTED REALITY REPRESENTATIONS FOR OBJECTS IN A USER LINE-OF-SIGHT

(71) Applicant: INTERNATIONAL BUSINESS MACHINES CORPORATION, Armonk, NY (US)

(72) Inventors: Raghuveer Prasad Nagar, Kota (IN); Sarbajit K. Rakshit, Kolkata (IN); Reji Jose, Bangalore (IN); Kavita Prasad, Patna (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/831,679

(22) Filed: Mar. 26, 2020

(51) Int. Cl.
| | |
|---|---|
| *G06K 9/00* | (2006.01) |
| *G06F 3/01* | (2006.01) |
| *G06T 19/00* | (2011.01) |
| *G06F 16/587* | (2019.01) |
| *G06F 16/29* | (2019.01) |

(52) U.S. Cl.
CPC ......... *G06K 9/00671* (2013.01); *G06F 3/013* (2013.01); *G06F 16/29* (2019.01); *G06F 16/587* (2019.01); *G06T 19/006* (2013.01); *G06T 2200/24* (2013.01); *G06T 2215/16* (2013.01)

(58) Field of Classification Search
None
See application file for complete search history.

(56) References Cited

U.S. PATENT DOCUMENTS 9,794,550 B2 10/2017 Khabiri et al.
2012/0212400 A1* 8/2012 Border .............. G06F 1/163
345/8

(Continued)

FOREIGN PATENT DOCUMENTS

| AU | 2012201615 | 4/2012 |
| WO | 2015192117 | 12/2015 |

OTHER PUBLICATIONS

Dahl, A.A., "Eye Strain", [online], [Retrieved on Mar. 25, 2020], Retrieved from the Internet at <URL: https://www.medicinenet.com/eye_strain/article.htm#what_causes_eye_strain>, 5 pp.

(Continued)

*Primary Examiner* — Edward Martello
(74) *Attorney, Agent, or Firm* — Konrad Raynes Davda & Victor LLP; David W. Vidor

(57) ABSTRACT

Provided are a computer program product, system, and method for generating in a gaze tracking device augmented reality representations for objects in a user line-of-sight. A determination is made of user coordinates of a user position and coordinates of an axis of a line-of-sight of the user from the gaze tracking device. Requested object information is received indicating objects along the axis of the line-of-sight at different distances from the user position, including a first object in the line-of-sight that is visible to the user at a first distance from the user position and at least one additional object. Each of the at least one additional object is at a further distance from the user position than the first distance. Descriptions of the objects are rendered to the user in a view of the gaze tracking device along the axis of the line-of-sight.

20 Claims, 7 Drawing Sheets

(56) References Cited

U.S. PATENT DOCUMENTS

| | | |
|---|---|---|
| 2016/0133053 A1 | 5/2016 | Fateh |
| 2017/0309079 A1 | 10/2017 | Naples et al. |
| 2018/0139434 A1* | 5/2018 | Roe ........................ H04N 13/15 |
| 2019/0295280 A1 | 9/2019 | DiVerdi et al. |
| 2019/0392643 A1* | 12/2019 | Busto ................. G06K 9/00604 |

OTHER PUBLICATIONS

Flaherty, R., "Scroll Depth: A Google Analytics Plugin for Measuring Page Scrolling", [online], [Retrieved on Mar. 2, 2020], Retrieved from the Internet at <URL: https://scrolldepth.parsnip.io/>, 8 pp.

Gallagher, J., "College Student Creates 'Scroll,' A Ring that Lets You Control Your AR Experience", [online], Aug. 7, 2017, [Retrieved on Mar. 2, 2020], Retrieved from the Internet at <URL: https://augmented.reality.news/news/college-student-creates-scroll-ringle . . . >, 5 pp.

Pai, Y.S., et al., "Transparent Reality: Using Eye Gaze Focus Depth as Interaction Modality", Proceedings of the 29th Annual Symposium on User Interface Software and Technology, Oct. 2016, 2 pp.

* cited by examiner

GENERATING IN A GAZE TRACKING DEVICE AUGMENTED REALITY REPRESENTATIONS FOR OBJECTS IN A USER LINE-OF-SIGHT

BACKGROUND OF THE INVENTION

1. Field of the Invention

The present invention relates to a computer program product, system, and method for generating in a gaze tracking device augmented reality representations for objects in a user line-of-sight.

2. Description of the Related Art

Current gaze tracking devices are typically worn as glasses and include cameras on the glasses to acquire gazed images being gazed by the eyes of the user. The gaze tracking device includes a camera to capture and analyze an eye image to determine the pupil location to acquire the gazed image the user eyes are staring at or tracking, i.e., gazing at directly. The gaze tracking device includes another camera to capture the scenes viewed by the user wearing the gaze tracking device, and the gazed image may comprise a localized region within the captured scene image.

There is a need in the art for developing applications for gaze tracking devices that will provide improved viewing experiences for users.

SUMMARY

Provided are a computer program product, system, and method for generating in a gaze tracking device augmented reality representations for objects in a user line-of-sight. A determination is made of user coordinates of a user position and coordinates of an axis of a line-of-sight of the user from the gaze tracking device. A request is made for object information based on the user position and the coordinates of the axis of the line-of-sight from a map database. The object information is received indicating objects along the axis of the line-of-sight at different distances from the user position, including a first object in the line-of-sight that is visible to the user at a first distance from the user position and at least one additional object. Each of the at least one additional object is at a further distance from the user position than the first distance, wherein the object information includes descriptions of the objects. The descriptions of the objects are rendered to the user in a view of the gaze tracking device along the axis of the line-of-sight.

DETAILED DESCRIPTION

When viewing objects, the user may not be able to view all objects in the current environment that are on an axis of the user line-of-sight because certain objects may be obstructed by closer objects in the line-of-sight. Further, the user may be able to display information on objects being viewed, but not display information on objects behind a first object in the user line-of-sight that are obstructed.

Described embodiments provide improvements to computer technology for rendering in a gaze tracking device information on objects on an axis of a user line-of-sight, including objects that may not be visible to the user along the axis of the line-of-sight because they are obstructed by other objects or obstacles. Described embodiments generate augmented reality representations of objects along the axis of a user line-of-sight to provide information on objects along the axis to enhance the user viewing experience. In further embodiments, the augmented reality representations are displayed in the perspective view of the user wearing the gaze tracking device with a size and dimension to appear at a position and depth aligned with the associated physical objects based on a distance from the user wearing the gaze tracking device.

Described embodiments provide improvements to computer technology to render information on objects in the line-of-sight by allowing the user to use input controls to scroll through the augmented reality representations of objects along the user line-of-sight. When the user uses input controls to perform depth scrolling, a selected augmented reality representation, which is not for the first object on the axis of the user line-of-sight will appear as the first augmented reality representation in the user line-of-sight to appear to be moving toward the user. Augmented reality representations between the selected augmented reality representation and the user will move behind the selected augmented reality representation to appear to be moving away from the user. To have the augmented reality representation appear to be moving away, the dimension of the augmented reality representation may be rendered smaller, which reduces content rendered in the augmented reality representation. To have selected augmented reality representations appear to be moving toward the user, the dimension of the augmented reality representation may be rendered larger, which increases the content rendered in the augmented reality representation.

Figure 1:
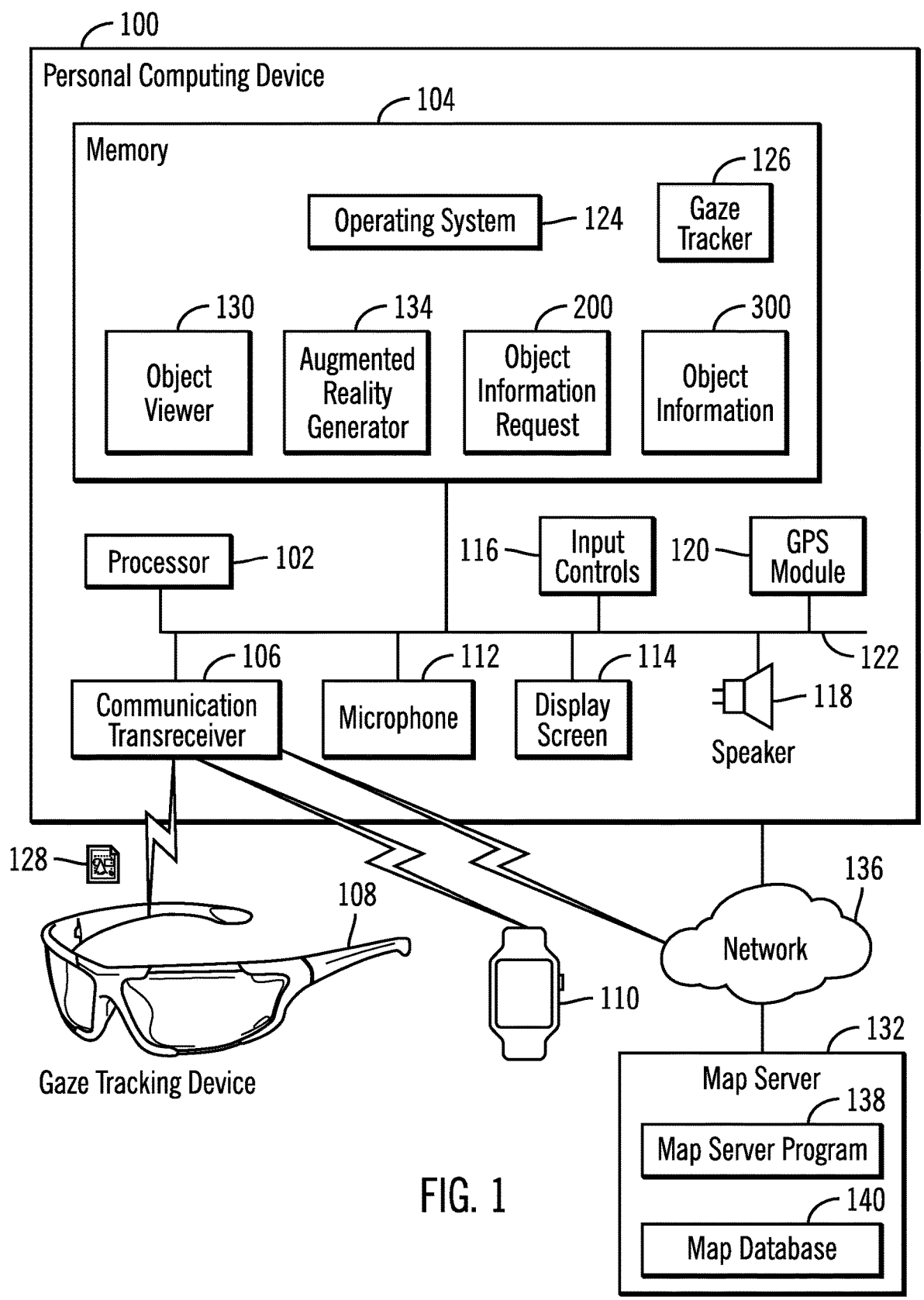
FIG. 1 illustrates an embodiment of a personal computing device interfacing with a gaze tracking device.

FIG. 1 illustrates an embodiment of a personal computing device 100 configured to render augmented reality representations of objects on an axis of a user line-of-sight. The personal computing device 100 includes a processor 102, a main memory 104, a communication transceiver 106 to communicate (via wireless communication or a wired connection) with external devices, including a wearable gaze tracking device 108 and a smartwatch 110 or other biometric gathering device capable of gathering biometric data, such as heart rate, blood pressure, etc.; a microphone 112 to receive as input sound external to the personal computing device 100; a display screen 114 to render display output to a user of the personal computing device rot 100; a speaker 116 to generate sound output to the user; input controls 118 such as buttons and other software or mechanical buttons, including a keyboard, to receive user input; and a global positioning system (GPS) module 120 to determine a GPS portions of the personal computing device. The components 102-120 may communicate over one or more bus interfaces 122.

The main memory 104 may include various program components including an operating system 124 to manage the personal computing device 100 operations and interface with device components 102-120; a gaze tracker program 126 to interface with the gaze tracking device 108 to receive a gazed image 128 detected by eye tracking cameras that acquire the gazed image 128 on which the tracked eye is fixed and information on coordinates of an axis of a line-of-sight, also referred to as sightline, visual axis, the user is viewing within the field of vision captured by the gaze tracking device 108; an object viewer 130 program to generate an object information request 200 to request object information 300 from a map server 132 on objects in the user line-of-sigh; and an augmented reality generator 134 to generate augmented reality representations for objects in an axis of the user line-of-sight based on the object information 300 to render in the gaze tracking device 108 glass. The gaze tracking device 108 includes computer display capabilities to display information and augmented reality representations from the computer 100, including to project augmented reality representations on the gaze tracking device 108 glass or display for the user to view.

The personal computing device 100 is connected to the map server 132 over a network 136, such as the Internet. The map server 132 includes a map server program 138 that receives requests for map information, such as an object information request 200, and queries a map database 142 having information on maps and objects in the maps, such as businesses, government services, restaurants, residences, etc. The map server program 138 returns object information 300 to a requesting computing device 100 to allow the computing device 100 to render information or augmented reality representations of map objects on a glass of the gaze tracking device 108.

The personal computing device 100 may comprise a smart phone, personal digital assistance (PDA), or stationary computing device capable of processing user information observed through the gaze tracking device 108. In further implementations, the personal computing device 100 may be integrated in the electronics of the gaze tracking device 108 and/or smartwatch 110.

The transceiver 106 may include Bluetooth, Wi-Fi, cellular, and/or other communication technologies. (Bluetooth is a registered trademark of Bluetooth SIG, Inc., WIFI is a trademark of the Wi-Fi Alliance)

Figure 2:
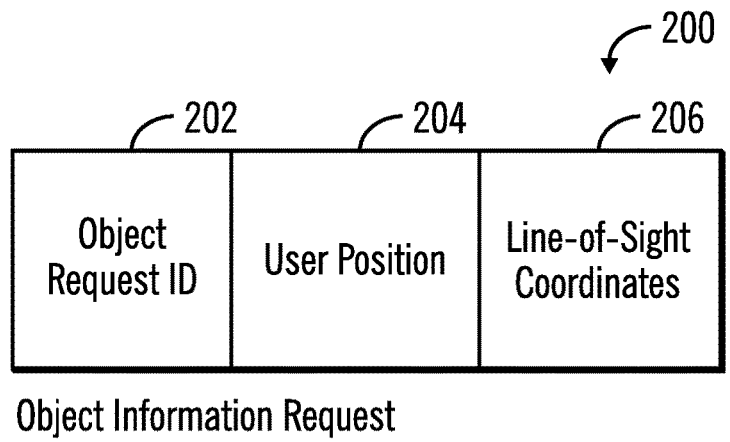
FIG. 2 illustrates an embodiment of an object information request on objects on an axis of a user line-of-sight.

In the embodiment of FIG. 2, the map server 132 is shown as a server accessible to the personal computing device 100 over a network 136. In an alternative embodiment, some or all components of the map server 132 may be implemented in the personal computing device 100.

The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

The bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Generally, program modules, such as the program components 124, 126, 130, 134 may comprise routines, programs, objects, components, logic, data structures, and so on that perform particular tasks or implement particular abstract data types. The program modules may be practiced in distributed cloud computing environments where tasks are performed by remote processing devices that are linked through a communications network. In a distributed cloud computing environment, program modules may be located in both local and remote computer system storage media including memory storage devices.

The program components and hardware devices of the personal computing device 100 of FIG. 1 may be implemented in one or more computer systems. If they are implemented in multiple computer systems, then the computer systems may communicate over a network.

The program components 124, 126, 130, 134 may be accessed by the processor 102 from the memory 104 to execute. Alternatively, some or all of the program components 124, 126, 130, 134 may be implemented in separate hardware devices, such as Application Specific Integrated Circuit (ASIC) hardware devices.

The functions described as performed by the program components 124, 126, 130, 134 may be implemented as program code in fewer program modules than shown or implemented as program code throughout a greater number of program modules than shown.

FIG. 2 illustrates an embodiment of an object information request 200 generated by the object viewer 130 to request information from the map server 132 on objects on an axis of a user line-of-sight determined from the gaze tracking device 108, and includes an object request ID 202; a user position 204, such as GPS position coordinates, of a user of the gaze tracking device 108; and line-of-sight coordinates 206, such as GPS or image coordinates, indicating coordinates of an axis of a line-of-sight currently viewed by the user.

Figure 3:
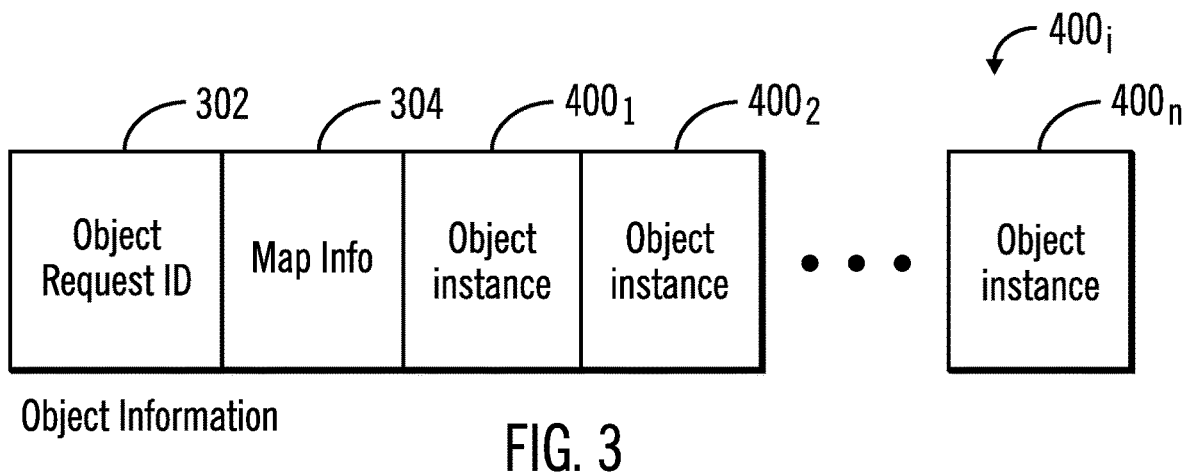
FIG. 3 illustrates an embodiment of object information having information on objects on an axis of a user line-of-sight returned in response to an object information request.

FIG. 3 illustrates an embodiment of object information 300 generated by the map server 132 in response to an object information request 200, and includes an object request ID 302 linking the object information with the object information request 200; map information 304 on a map including the determined objects; and one or more object instances $400_1$, $400_2$ . . . $400_n$ having information on each of the determined objects in the user line-of-sight.

Figure 4:
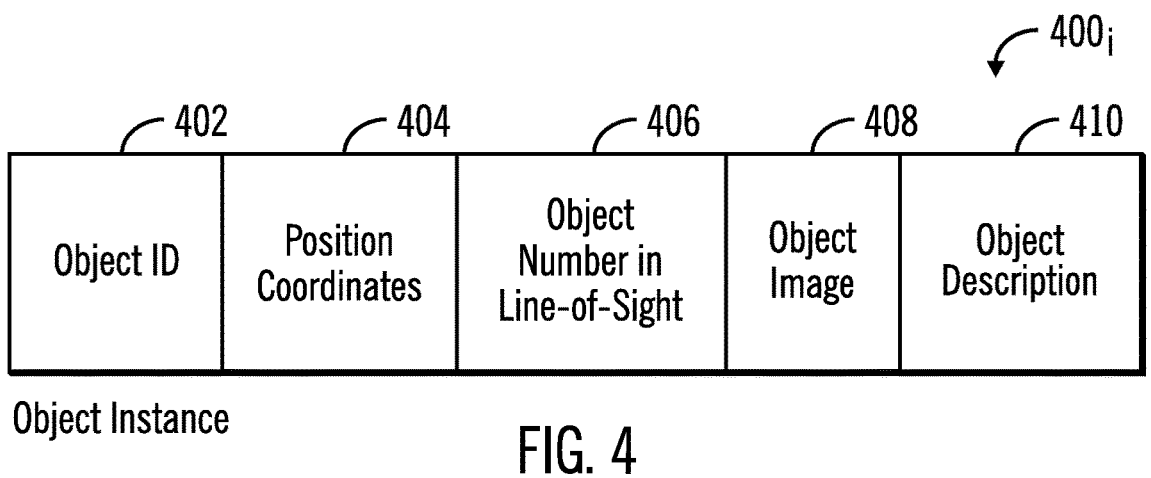
FIG. 4 illustrates an embodiment of an object instance included in the object information for each object on an axis of the user line-of-sight.

FIG. 4 illustrates an embodiment of an object instance $400_i$ generated by the map server 132 and included in the object information 300, such as object instances $400_1$, $400_2$ . . . $400_n$, and includes: an object identifier (ID) 402; position coordinates 404 of the object 402 on a map, such as latitude and longitude, GPS coordinates; an object number along the axis of the user line-of-sight 406, such as the first, second, third, etc. object in the user line-of-sight extending from the user; an object image 408 of the object 402, such as a still image or video; and an object description 410 providing descriptive information on the object and optionally hypertext links to further object information. An object is considered on or along the axis of the user line-of-sight or on or along the user line-of-sight as described herein when the coordinates of the axis of the line-of-sight extends through the object or the object is a predetermined geographical distance from the axis of the line-of-sight coordinates.

Figure 5:
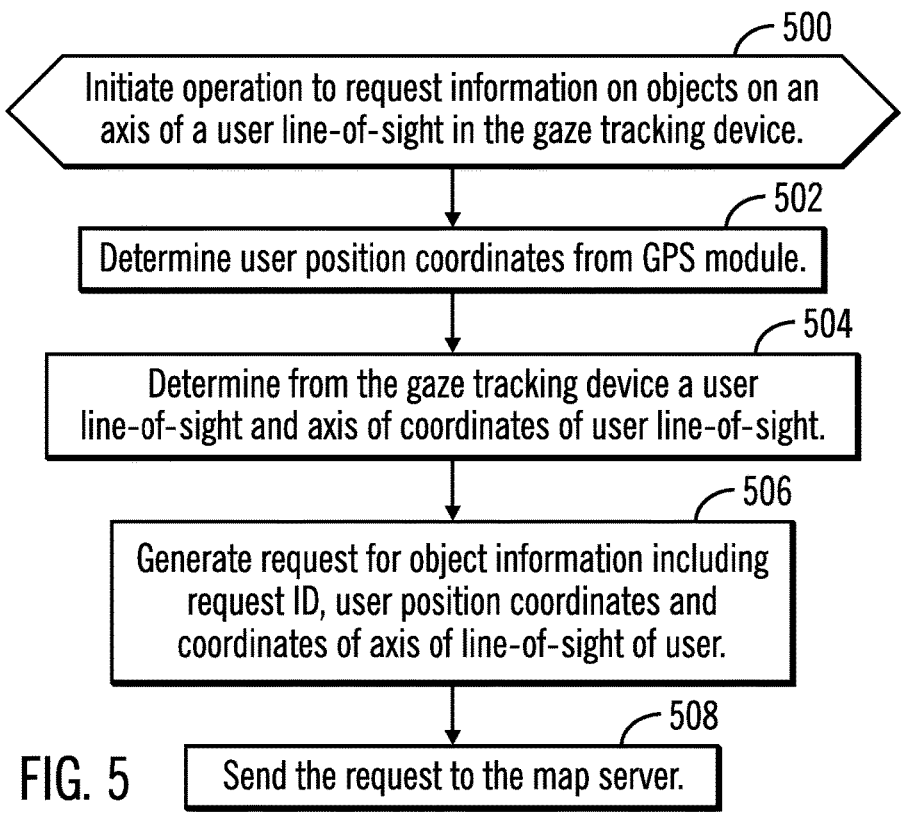
FIG. 5 illustrates an embodiment of operations to request information on objects on an axis of the user line of sight.

FIG. 5 illustrates an embodiment of operations performed by the object viewer 130 and gaze tracker 126 to obtain information on objects along an axis of the user line-of-sight that may be visible or obscured to the user wearing the gaze tracking device 108. This operation may be initiated in response to voice or input commands to the gaze tracking device 108 or personal computing device 100. Upon initiating (at block 500) the operation to render augmented reality representations and information on object, the object viewer 130 determines user position coordinates from the GPS module 120. The object viewer 130, through the gaze tracker 126, determines (at block 504) from the gaze tracking device 108, such as from the image 128 of the user view, a user line-of-sight and axis of coordinates of user line-of-sight. A request for object information 200 is generated (at block 506) including a request ID 202, user position coordinates 204, and the coordinates of an axis of the line-of-sight of the user 206. The request 200 is sent (at block 508) to the map server 132 over the network 136 or through the memory 104 is the map server 132 is implemented in the personal computing device 100.

With the embodiment of FIG. 5, the request for information on objects in a user line-of-sight being viewed through a gaze tracking device 108 is generated in real-time while the user is viewing an area to obtain the information in real-time to supplement what the user is viewing while viewing.

Figure 6:
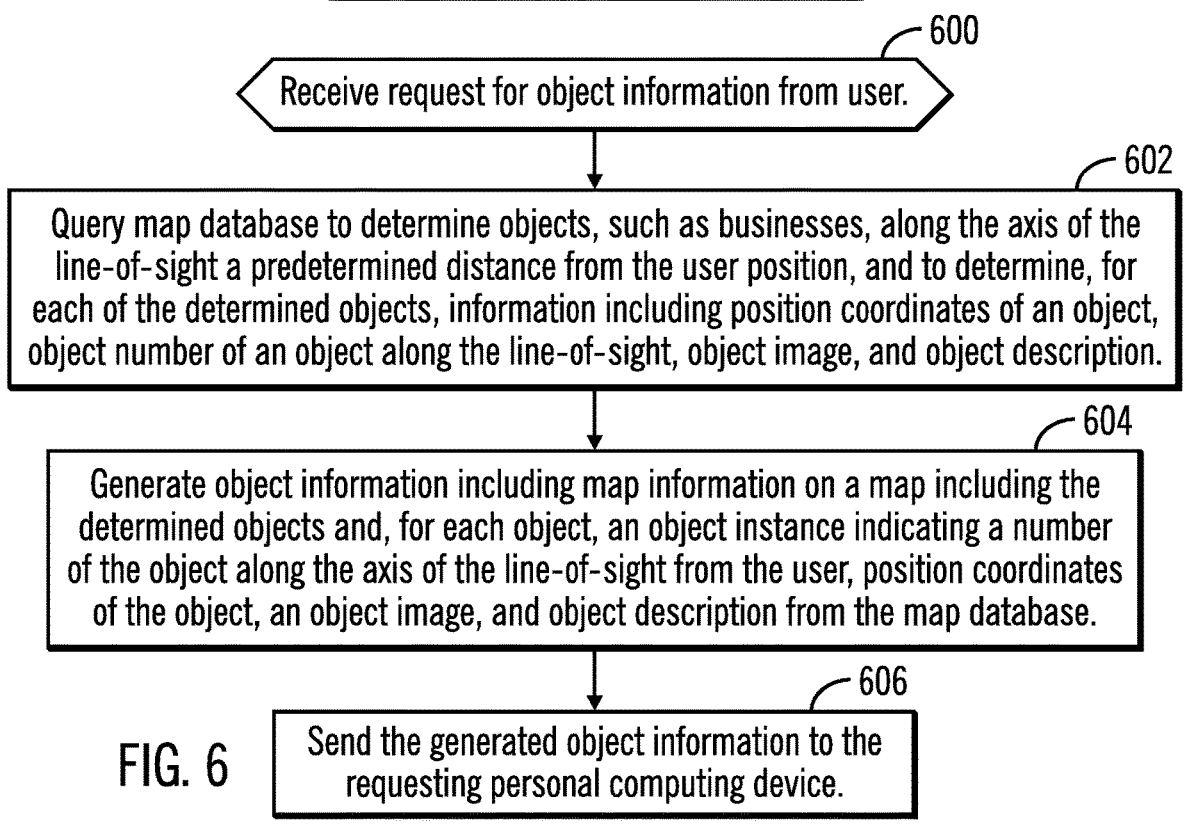
FIG. 6 illustrates an embodiment of operations for a map server to process a request for object information on objects on an axis of a user line of sight.

FIG. 6 illustrates an embodiment of operations performed by the map server program 138 to generate object information 300 of objects on an axis of a line-of-sight of the user, where the objects may be visible to the user or obscured by other objects along the axis of the line of sight. Upon receiving (at block 600) the object information request 200, the map server program 138 queries (at block 602) the map database 140 to determine objects, such as representing businesses, government services, residences, along the coordinates of the axis of the line-of-sight 206 and a predetermined distance from the user position 204 in the request 200. The query also determines information on the objects, including object position coordinates, object image, and object description. Objects along the axis line-of-sight 206 may comprise objects through which the axis line-of-sight 206 extends or all objects a predetermined distance from the coordinates of the axis line-of-sight 206 orthogonal to the axis of the line-of-sight. The map server program 138 generates (at block 604) object information 300 including map information 304 on a map including the determined objects and, for each determined object i, an object instance $400_i$ indicating position coordinates of the object 404, a number of the object 406 along the axis of the line-of-sight from the user, an object image 408, and object description 410 from the map database 140. The generated object information 300 is returned (at block 606) to the personal computing device 100.

Figure 7:
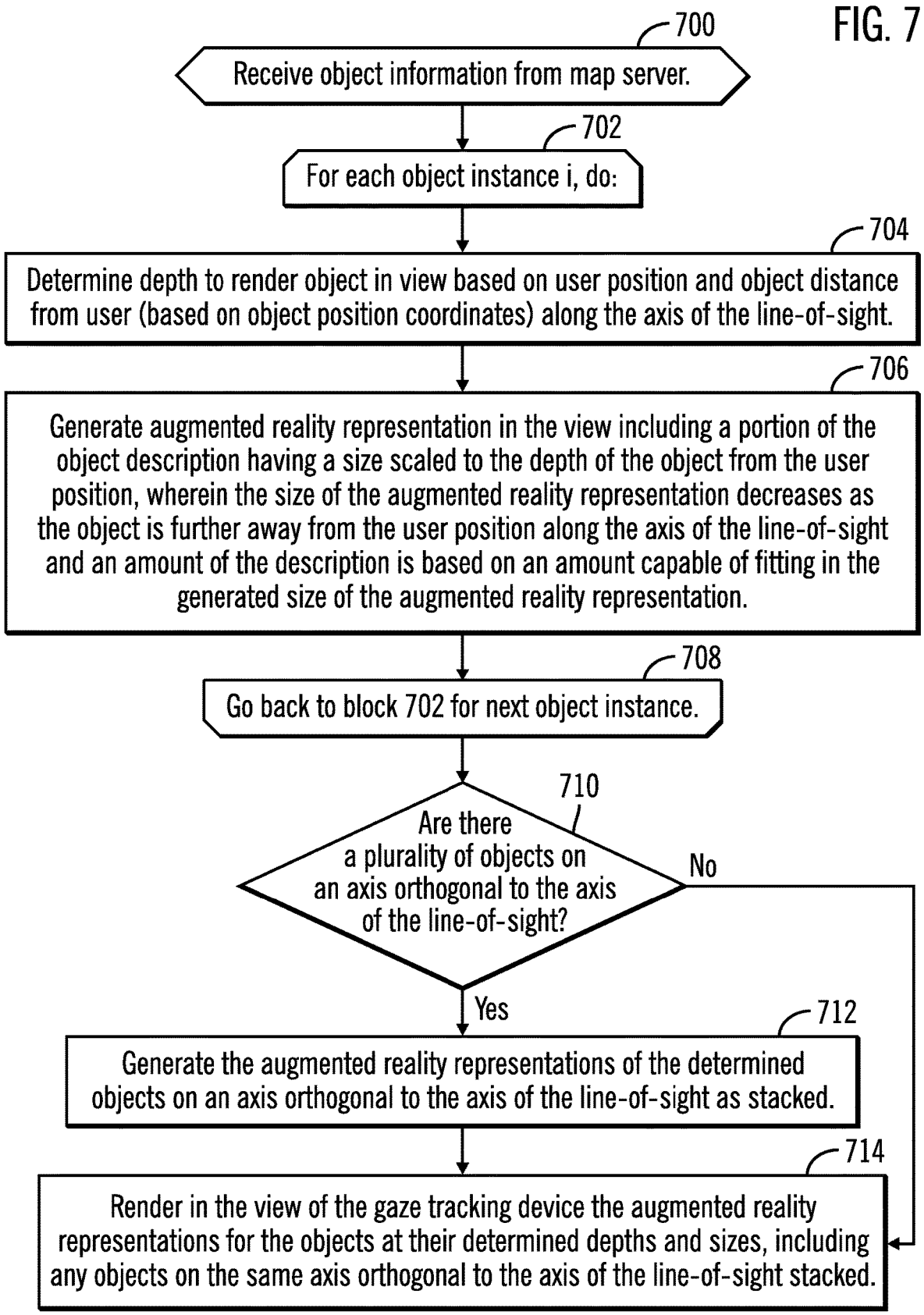
FIG. 7 illustrates an embodiment of operations to render augmented reality representations of objects on an axis of a user line of sight in a gaze tracking device worn by the user.

FIG. 7 illustrates an embodiment of operations performed by the object viewer 130, gaze tracker 126, and augmented reality generator 134 to render augmented reality representations or other information for objects on an axis of a user line-of-sight, including objects visible to the user or objects along the axis of the user line-of-sight obscured by other objects, including objects closer to the user one the axis of the user line-of-sight. Upon receiving (at block 700) object information 300 from the map server 132, the object viewer 130 and augmented reality generator 134 perform the operations at blocks 702 through 708 to generate augmented reality representations for each of the object instances 400i in the received object information 300 for objects along the user axis line-of-sight. The object viewer 130 determines (at block 704) the depth to render the object in the view projected on the gaze tracking device 108 glass based on the user position and object distance from the user, which is based on the object position coordinates 404. The augmented reality generator 134 is called to generate (at block 706) an augmented reality representation in the view including a portion of the object description 410 having a size scaled to the depth of the object from the user position according to a perspective view from the user, so that augmented reality representations for objects further away from the user are rendered smaller to appear further away in the depth field from the user and augmented reality representations for objects closer to the user are rendered larger to appear closer in the depth field to the user. An amount of the description 410 included in the augmented reality representation is based on an amount of text and other information capable of fitting in the generated size of the augmented reality representation. In further embodiments, the augmented reality representation may include an image 408 of the object superimposed over the area where the object is to be located to have a size to appear in the perspective view of the user in relation to the size of other objects in the user depth field.

After generating the augmented reality representations for the objects based on the object instances $400_i$ in the object information 300, then the augmented reality generator 134 determines whether (at block 710) there are a plurality of objects on an axis orthogonal to the axis of the user line of sight, or objects a same distance from the user along the axis of the line of sight but at offset at different distances from the axis of the line of sight. If there are objects on an axis orthogonal to the axis of the line of sight, then the augmented reality generator 134 generates (at block 712) the augmented reality representations of the determined objects on an axis orthogonal to the axis of the line-of-sight as stacked. The generated augmented reality representations are rendered (at block 714) on the display of the gaze tracking device 108 on the same orthogonal axis may be generated stacked with dimensions of the same size to appear at the same depth to the user.

In the embodiment of FIG. 7, augmented reality representations of information on objects are rendered. In alternative embodiments, other types of information on objects may be rendered in manners other than augmented reality representations.

Figures 8, 9:
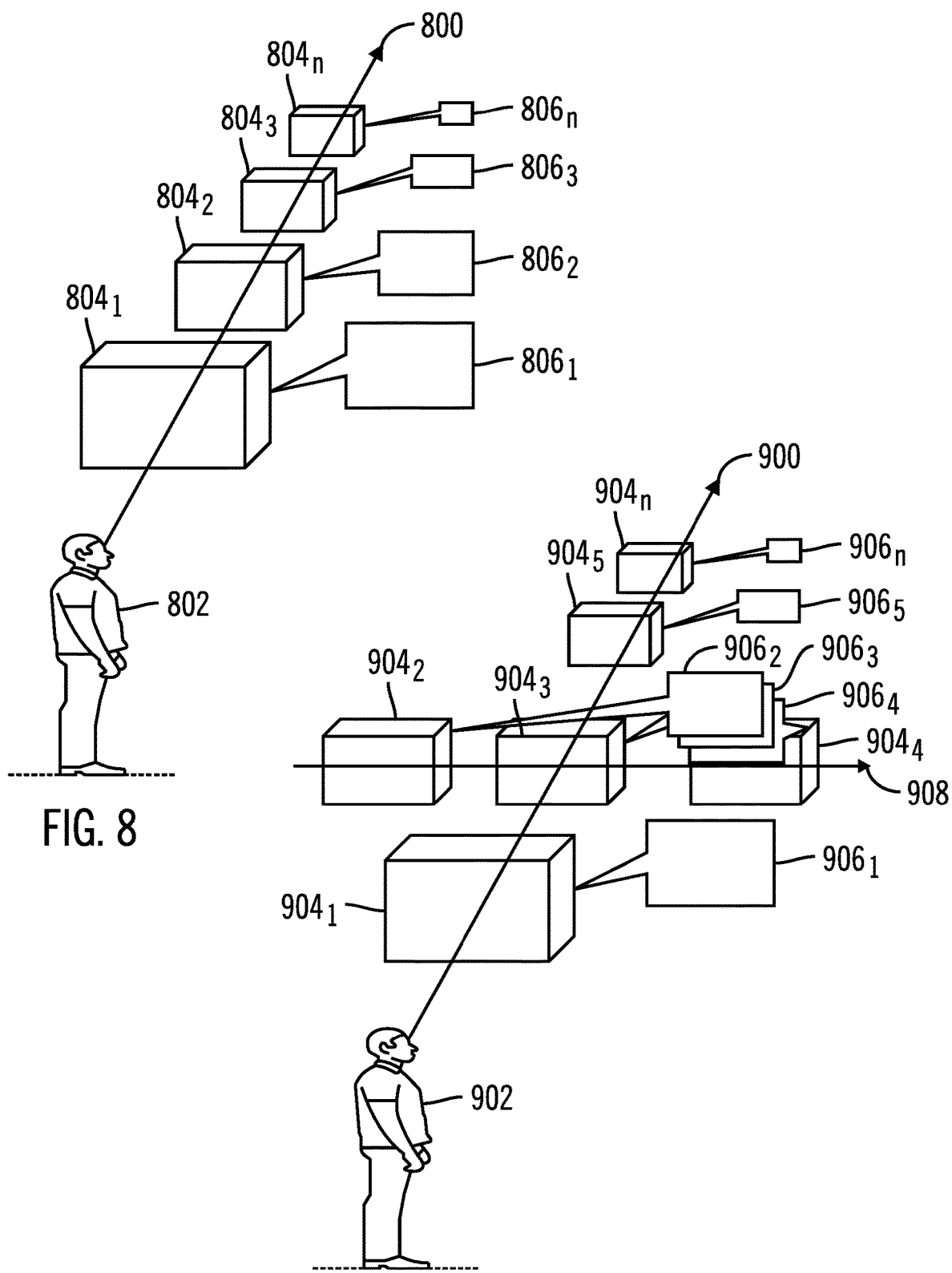
FIGS. 8 and 9 illustrate an example of how augmented reality representations are rendered for objects on an axis of a user line-of-sight.

FIG. 8 illustrates an example of the rendering of the augmented reality representations along the axis of the line-of-sight 800 from a user 802 wearing the gaze tracking device 108 and objects $804_1, 804_2, 804_3 \ldots 804_n$ along the axis of the user line-of-sight 800. Objects $804_2 \ldots 804_n$ following the first object $804_1$ in the axis of the line-of-sight 800 may be visible or obscured by objects or other obstructions. The augmented reality representations $806_1, 806_2, 806_3 \ldots 806_n$ are shown as rendered for the objects $804_1, 804_2, 804_3 \ldots 804_n$. Augmented reality representations $806_1, 806_2, 806_3 \ldots 806_n$ a further depth or distance from the user are rendered smaller with less information on the associated objects $804_1, 804_2, 804_3 \ldots 804_n$ to appear further away from the user in the depth field where those representations closer are rendered with larger dimensions to appear closer in the depth field.

FIG. 9 illustrates an example of the rendering of the augmented reality representations along the axis of the line-of-sight 900 from a user 902 wearing the gaze tracking device 108 and objects $904_1, 904_2, 904_3, 904_4, 904_5 \ldots 904_n$ along the axis of the user line-of-sight 900 where certain of the objects $904_2, 904_3, 904_4$, are on an axis orthogonal 908 with respect to the axis of the line of sight 900. Objects $904_2 \ldots 904_n$ following the first object $904_1$ along the axis of the line-of-sight 900 may be visible or obscured by objects or other obstructions. The augmented reality representations $906_1, 906_2, 906_3 \ldots 906_n$ are shown as rendered for objects $904_1, 904_2, 904_3 \ldots 904_n$. Augmented reality representations $906_2, 906_3, 906_4$ for objects $904_2, 904_3, 904_4$ along the axis orthogonal 908 to the axis of the line-of-sight are rendered stacked in the view of the gaze tracking device 108 according to the operations 710 and 712 in FIG. 7. Augmented reality representations $906_2, 906_3, 906_4$ along the axis orthogonal 908 to the axis of the line-of-sight 900 may be rendered the same size and with the same amount of descriptive information 410 to appear at the same depth in the user perspective view. Augmented reality representations $906_2, 906_3, 906_4$ are rendered smaller than the augmented reality representation $906_1$ for the first object $904_1$ closer to the user 902 to appear closer to the user in the user field of depth and larger than augmented reality representations $906_5 \ldots 906_n$ for objects $904_5 \ldots 904_n$ further away from the user 902 to appear further away from the user in the user field of depth. Augmented reality representations $906_1, 906_2, 906_3 \ldots 906_n$ a further depth or distance from the user 902 are rendered smaller with less information on the associated objects $904_1, 904_2, 904_3 \ldots 904_n$ than augmented reality representations closer to the user 902.

Figure 10:
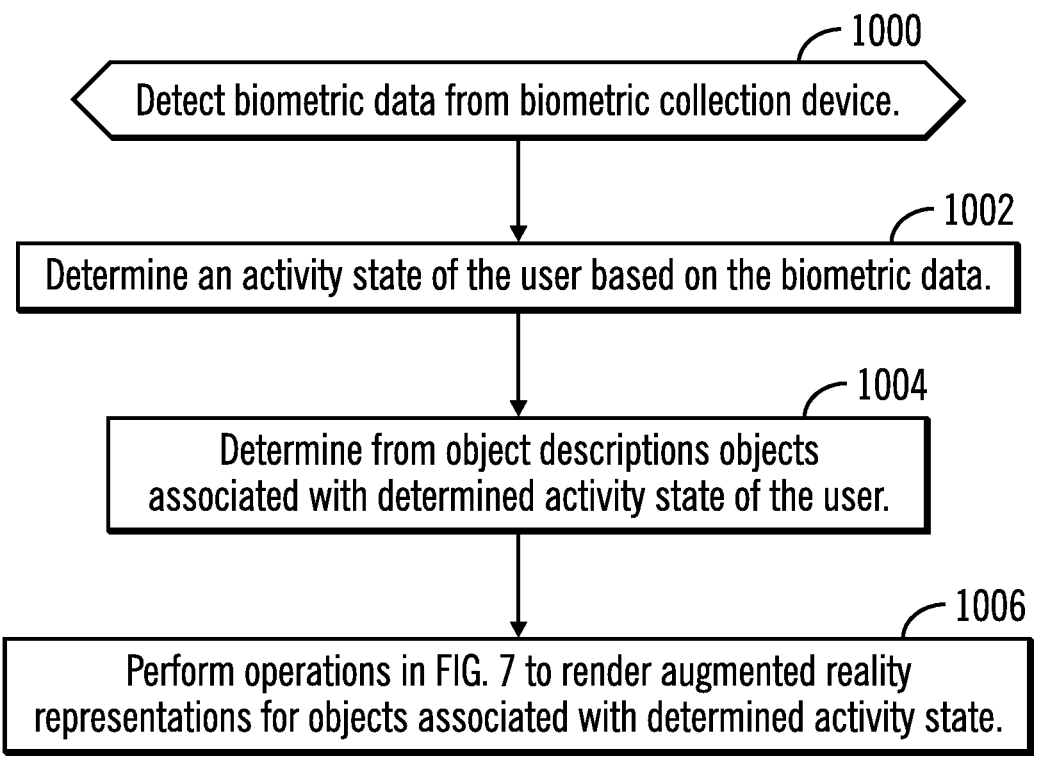
FIG. 10 illustrates an embodiment of operations to use biometric data to render augmented reality representations of objects on an axis of a user line-of-sight.

FIG. 10 illustrates an embodiment of operations performed by the object viewer 130, gaze tracker 126, and augmented reality generator 134 to render augmented reality representations or other information for objects on an axis of a user line-of-sight that are associated with an activity state of the user determined from biometric data gathered from the biometric monitoring device 110. Upon the object viewer 130 or other component detecting biometric data from the biometric collection device 110, the object viewer 130 determines (at block 1002) an activity state, such as a biometric parameter, mobility pattern, etc., based on the detected biometric data. The activity state may be determined using machine learning algorithms to determine one of different activity states from different input sets of biometric data or may be determined according to other association algorithms. The object viewer 130 determines (at block 1004) from the object descriptions 410 objects associated with determined activity state of the user. For instance, if the activity shows exercising or high heart rate, the associated objects may indicate locations that provide goods and services for someone exercising. The components 126, 130, and 134 may then perform (at block 1006) the operations of FIG. 7 to render augmented reality representations for objects associated with the determined activity state.

With the operations of FIG. 10, the user activity state or other categorization of the user based on biometric data may determine objects or locations most suited for the current user activity to display augmented reality representation information for objects most relevant to the user's biometric parameters that may be most relevant to the user at the moment.

Figure 11:
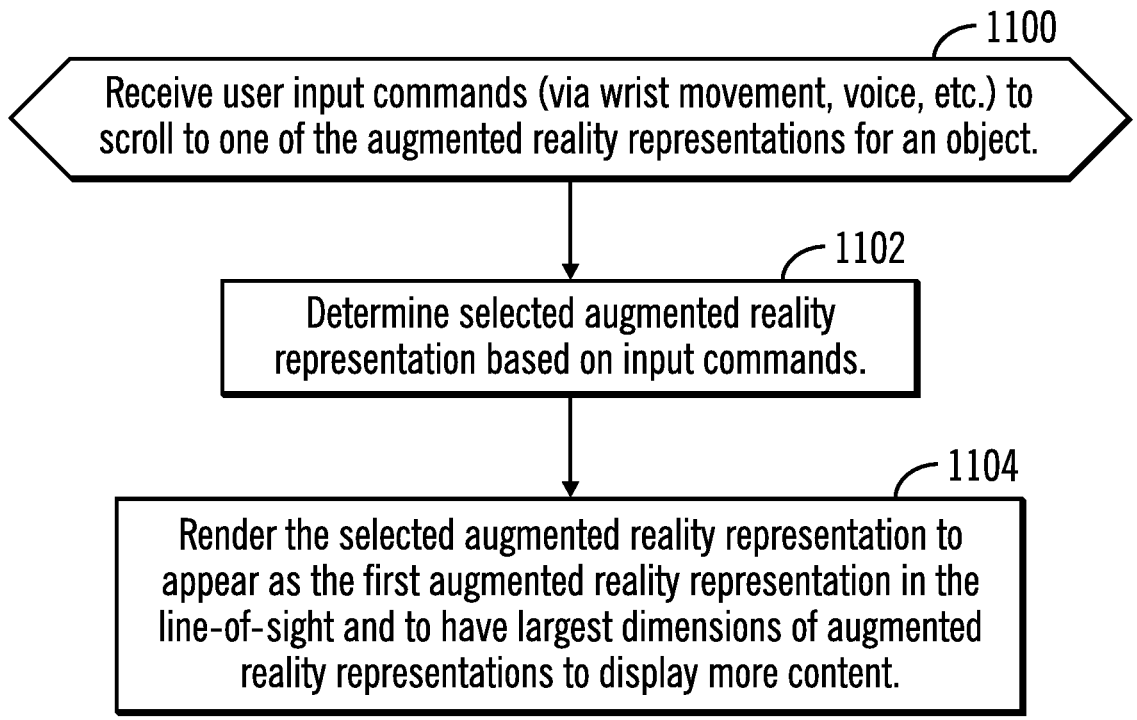
FIG. 11 illustrates an embodiment of operations to allow a user to select an object to provide enhanced viewing of the augmented reality representation of the selected object.

FIG. 11 illustrates an embodiment of operations performed by the object viewer 130, gaze tracker 126, and augmented reality generator 134 to allow the user to scroll to an object having an augmented reality representation rendered in the gaze tracking device 108. The user may provide user input commands to scroll through the augmented reality representations using input controls 116 on the computing device 100 or gaze tracking device 108 or by the smartwatch 110 detecting user hand movement indicating to scroll from one object to another whose augmented reality representation rendered in the gaze tracking device 108. In one embodiment, when the user moves fingers, the smartwatch may detect the movement to determine the scrolling action with respect to the objects based on the movement and direction of finger movement, and speed of speed the finger gesture. In a further embodiment, a camera of the gaze tracking device 108 can track and recognize user hand and figure gestures to provide input to the selection of objects along the axis of the user line of sight to navigate through the augmented reality objects using depth scrolling. For instance, user finger rotation-based finger movement may be mapped to depth scrolling of the rendered augmented reality representations. The movement direction and speed of user finger and hand gestures are used to determine the depth scrolling through the augmented reality representations. User voice commands may also be used to provide depth scrolling input commands through the microphone 112.

Upon receiving (at block 1100) user input commands to scroll to one of the augmented reality representations, the object viewer 130 determines (at block 1102) the selected augmented reality representation based on the input commands. The user may scroll among the augmented reality representations for objects by scrolling the augmented reality representations 806$i$, 906$i$ of the objects. The augmented reality generator 134 may render (at block 1104) the selected augmented reality representation to appear as the first augmented reality representation in the line-of-sight and to have largest dimensions of augmented reality representations to display more content.

In a further embodiment, the user may perform depth scrolling to sequentially select augmented reality representations of the objects, such as by entering movement via wrist movements or other input controls. The selected augmented reality representation will appear to move towards the user by displaying the selected augmented reality representation with larger dimensions as the first augmented reality representation in the line-of-sight. Augmented reality representations between the user and the selected augmented reality representations will appear to be moving away by being displayed following the selected augmented reality representation in the line of sight and smaller than the selected augmented reality representation. Increasing the dimensions and additional content in the selected augmented reality representations allows the user to visualize additional required content in the selected augmented reality representation.

Figure 12:
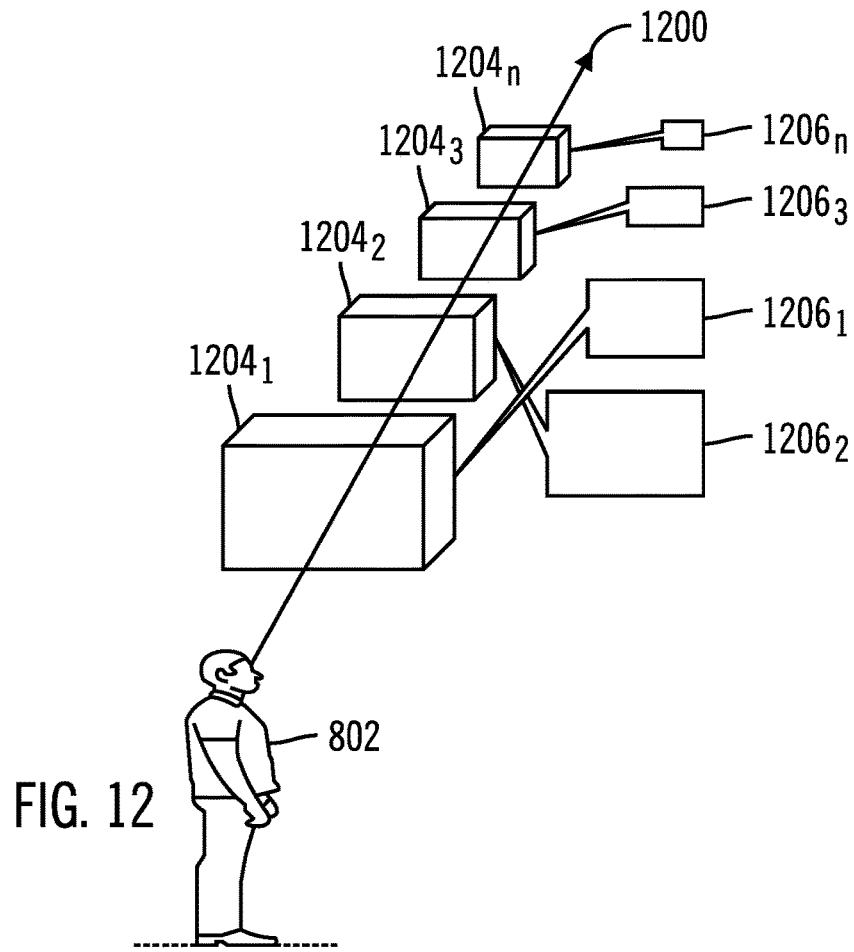
FIG. 12 illustrates an example of how augmented reality representations are rendered for objects, including a selected object according to FIG. 11, on an axis of a user line-of-sight.

FIG. 12 illustrates an example of the scrolling of the augmented reality representations along the axis of the line-of-sight 1200 from a user 1202 wearing the gaze tracking device 1012 and objects $1204_1$, $1204_2$, $1204_3$ . . . $1204_n$ along the axis of the user line-of-sight 1200. Objects $1204_2$ . . . $1204_n$ following the first object $1204_1$ in the axis of the line-of-sight 1200 may be visible or obscured by objects or other obstructions. The augmented reality representations $1206_1$, $1206_2$, $1206_3$ . . . $1206_n$ are shown as rendered for the objects $1204_1$, $1204_2$, $1204_3$ . . . $1204_n$. FIG. 12 shows the result of the user selecting object $1204_2$ according to FIG. 11, by scrolling. Depth scrolling changes the display to have the selected augmented reality representation $1206_2$ appear as the first augmented reality representation in the user 1202 line-of-sight 1202 and to appear larger to produce the visual effect that the selected augmented reality representation $1206_2$ is moving forward toward the user 1202. The augmented reality representation $1206_1$ between the selected augmented reality representation $1206_2$ is displayed behind the selected augmented reality representation $1206_2$ and displayed with smaller dimensions to produce the visual effect that the augmented reality representation $1206_1$ is moving away from the user 1202.

Augmented reality representations $1206_3$ . . . $1206_n$ a further depth or distance from the user are rendered smaller with less information on the associated objects $1204_1$, $1204_2$, $1204_3$ . . . $1204_n$. The selected augmented reality representation is rendered with larger dimensions to render more information and description for the selected object.

With the embodiment of FIGS. 11 and 12, user gestures and/or voice commands to select augmented reality representations at different distances or depths in the perspective view can visually move the selected object forward in the user line-of-sight 1200 for better viewability. If an augmented reality representation at a distance is brought forward by the user, then additional digital information associated with the augmented reality representation (which may provide more information about the real-world object) will be shown to the user.

Figure 13:
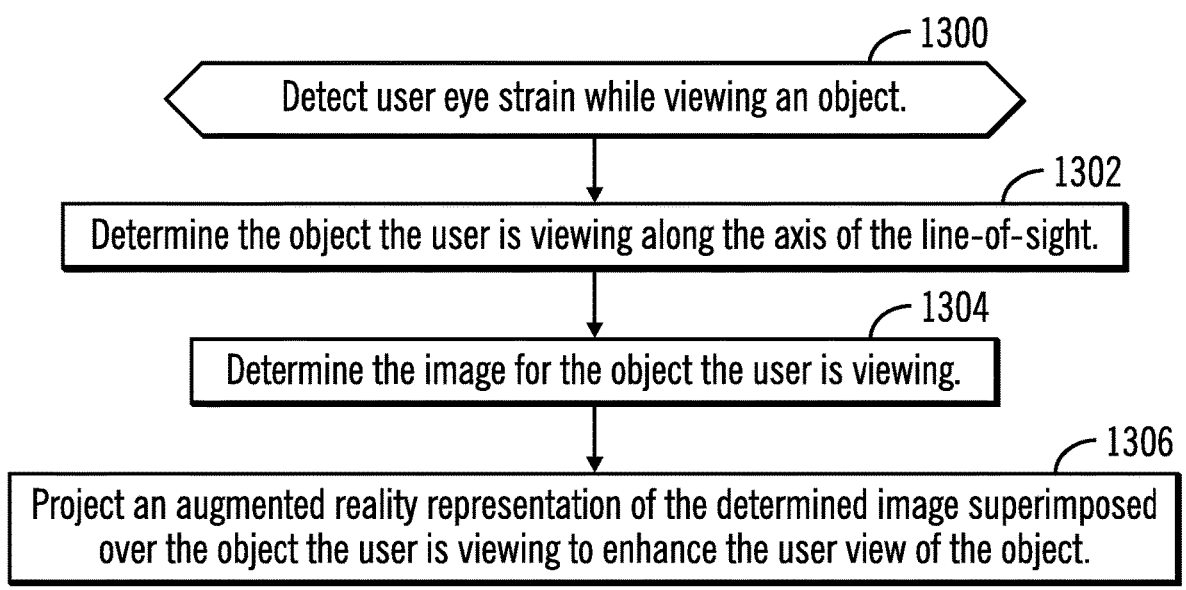
FIG. 13 illustrates an embodiment of operations to render augmented reality representations for an object when the user is experiencing eye strain.

FIG. 13 illustrates an embodiment of operations performed by the object viewer 130, gaze tracker 126, and augmented reality generator 134 to render augmented reality representations upon detecting the user is straining their eyes to observe an object in the line-of-sight. The gaze tracking device 108 may include a high-sensitivity image sensor facing away from the user and in the direction of the user's view. The gaze tracking device 108 includes sensors to identify in low light conditions low light around an object that the user is trying to view and includes sensors to detect the expansion of the user's pupil in the eyes and the muscle strain (in the user's eyelids, face, temples, etc.) to detect eye strain. Upon the gaze tracking device 108 detecting (at block 1300) eye strain and communicating eye strain to the object viewer 130, via the gaze tracking device 108 and gaze tracker 126 program, the object viewer 130 determines the object the user is straining to view along the axis of the line-of-sight. The object viewer 130 may then determine (at block 1304) the object image 408 in the object instance $400_i$ for the object the user is straining to view. The augmented reality generator 134 projects (at block 1306) an augmented reality representation of the determined image 408 on the display of the gaze tracking device 108 superimposed over the object the user is viewing to enhance the user view of the object.

With the embodiment of FIG. 13, if the user is straining to observe an object, an image of the object the user is straining to view may be automatically rendered superimposed over the object in the user line-of-sight as an augmented reality representation to assist the user in viewing the object without eye strain to enhance the user viewing experience and provide better visibility and definition of the object. The transition from the user's view of the real-world object to the enhanced augmented reality view of the object may be gradual, such as phased-in, allowing for the user's eye to adjust to the difference in the luminance (or intensity of light).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing information on objects to render on a user operated gaze tracking device, the computer program product comprising a computer readable storage medium having computer readable program code embodied therein that executes to perform operations, the operations comprising:
   determining user coordinates of a user position and coordinates of an axis of a line-of-sight of the user from the gaze tracking device;
   requesting object information based on the user position and the coordinates of the axis of the line-of-sight from a map database to cause a query at the map database to determine object information for objects along the axis of the line-of-sight at determined distances from the user position;
   receiving the object information indicating objects along the axis of the line-of-sight at different distances from the user position, including a first object in the line-of-sight that is visible to the user at a first distance from the user position and at least one additional object, wherein each of the at least one additional object is at a further distance from the user position than the first distance, wherein the object information includes descriptions of the objects, and wherein an obstructed object along the axis of the line-of-sight for which object information is received is not visible to the user from the user position on the axis of the line-of-sight as a result of being obstructed; and
   rendering the descriptions of the objects to the user in a view of the gaze tracking device along the axis of the line-of-sight including a description for the obstructed object.

2. The computer program product of claim 1, wherein the rendering the descriptions of the objects comprises rendering augmented reality representations of the descriptions of the objects in the view of the gaze tracking device displayed along the axis of the line-of-sight.

3. The computer program product of claim 2, wherein the rendering the augmented reality representations of the objects comprises:
   rendering an augmented reality representation for each object of the objects to appear at a depth in a perspective view of the user along the axis of the line-of-sight corresponding to a distance of the object from the user position.

4. The computer program product of claim 2, wherein the operations further comprise:
   receiving user selection of an augmented reality representation for an object following a first augmented reality representation for the first object along the axis of the line-of-sight; and
   rendering the selected augmented reality representation in the gaze tracking device to appear ahead of the first augmented reality representation along the axis of the line-of-sight in response to receiving the user selection.

5. The computer program product of claim 4, wherein the rendering the selected augmented reality representation further comprises rendering the selected augmented reality representation with larger dimensions than the first augmented reality representation for the first object and rendering the selected augmented reality representation with additional content from a description of the object associated with the selected augmented reality representation in the object information.

6. The computer program product of claim 5, wherein before receiving user selection of the augmented reality representation, performing:
   rendering the first augmented reality representation larger than the augmented reality representations for additional objects following the first object along the axis of the line-of-sight; and
   rendering each augmented reality representation, for each additional object following the first object along the axis of the line-of-sight, smaller in appearance than the augmented reality representation for a preceding object along the axis of the line-of-sight closer to the user position.

7. The computer program product of claim 2, wherein the operations further comprise:
   receiving user input commands to scroll to a selected one of the augmented reality representations along the axis of the line-of-sight other than the first object; and
   rendering the augmented reality representation of the selected augmented reality representation to appear first in the axis of the line-of-sight to provide a visual effect to the user that the selected augmented reality representation is moving forward toward the user and a first augmented reality representation for the first object is moving away from the user.

8. The computer program product of claim 2, wherein the object information indicates a plurality of objects on an axis orthogonal to the axis of the line-of-sight further away from the user position than the first distance, wherein the operations further comprise:
   rendering a sequential display of augmented reality representations of the objects along the axis orthogonal to the axis of the line-of-sight;
   receiving user selection of one of the augmented reality representations along the axis orthogonal to the axis of the line-of-sight; and
   rendering the selected augmented reality representation along the axis orthogonal to the axis of the line-of-sight to appear in front of other of the augmented reality representations along the axis orthogonal to the axis of the line-of-sight.

9. The computer program product of claim 2, wherein the object information includes an image of an object for each of the objects indicated in the object information, wherein the operations further comprise:
   detecting eye strain for the user along the axis of the line-of-sight; and
   in response to detecting the eye strain, performing:
      determining an object the user is viewing in the axis of the line-of-sight;
      determining the image for the object the user is viewing in the object information; and
      superimposing an augmented reality representation using the image for the object the user is viewing over the object the user is viewing to enhance a user view of the object the user is viewing.

10. The computer program product of claim 1, wherein the operations further comprise:
   gathering biometric data from a user via a biometric gathering device coupled to the user;
   determining, from the gathered biometric data, an activity state of the user; and
   determining objects along the axis of the line-of-sight within a predetermined distance from the user that have a description in the object information associated with the determined activity state of the user, wherein augmented reality representations are rendered for objects associated with the determined activity state of the user.

11. A system for providing information on objects to render on a user operated gaze tracking device, comprising:
 a processor; and
 a computer readable storage medium having computer readable program code embodied therein that executes to perform operations, the operations comprising:
  determining user coordinates of a user position and coordinates of an axis of a line-of-sight of the user from the gaze tracking device;
  requesting object information based on the user position and the coordinates of the axis of the line-of-sight from a map database to cause a query at the map database to determine object information for objects along the axis of the line-of-sight at determined distances from the user position;
  receiving the object information indicating objects along the axis of the line-of-sight at different distances from the user position, including a first object in the line-of-sight that is visible to the user at a first distance from the user position and at least one additional object, wherein each of the at least one additional object is at a further distance from the user position than the first distance, wherein the object information includes descriptions of the objects, and wherein an obstructed object along the axis of the line-of-sight for which object information is received is not visible to the user from the user position on the axis of the line-of-sight as a result of being obstructed; and
  rendering the descriptions of the objects to the user in a view of the gaze tracking device along the axis of the line-of-sight including a description for the obstructed object.

12. The system of claim 11, wherein the rendering the descriptions of the objects comprises rendering augmented reality representations of the descriptions of the objects in the view of the gaze tracking device displayed along the axis of the line-of-sight.

13. The system of claim 12, wherein the operations further comprise:
 receiving user selection of an augmented reality representation following a first augmented reality representation for the first object along the axis of the line-of-sight; and
 rendering the selected augmented reality representation in the gaze tracking device to appear ahead of the first augmented reality representation along the axis of the line-of-sight in response to receiving the user selection.

14. The system of claim 12, wherein the operations further comprise:
 receiving user input commands to scroll to a selected one of the augmented reality representations along the axis of the line-of-sight other than the first object; and
 rendering the augmented reality representation of the selected augmented reality representation to appear first in the axis of the line-of-sight to provide a visual effect to the user that the selected augmented reality representation is moving forward toward the user and a first augmented reality representation for the first object is moving away from the user.

15. The system of claim 12, wherein the object information includes an image of an object for each of the objects indicated in the object information, wherein the operations further comprise:

detecting eye strain for the user along the axis of the line-of-sight; and
 in response to detecting the eye strain, performing:
  determining an object the user is viewing in the axis of the line-of-sight;
  determining the image for the object the user is viewing in the object information; and
  superimposing an augmented reality representation using the image for the object the user is viewing over the object the user is viewing to enhance a user view of the object the user is viewing.

16. A method for providing information on objects to render on a user operated gaze tracking device, comprising:
 determining user coordinates of a user position and coordinates of an axis of a line-of-sight of the user from the gaze tracking device;
 requesting object information based on the user position and the coordinates of the axis of the line-of-sight from a map database to cause a query at the map database to determine object information for objects along the axis of the line-of-sight at determined distances from the user position;
 receiving the object information indicating objects along the axis of the line-of-sight at different distances from the user position, including a first object in the line-of-sight that is visible to the user at a first distance from the user position and at least one additional object, wherein each of the at least one additional object is at a further distance from the user position than the first distance, wherein the object information includes descriptions of the objects, and wherein an obstructed object along the axis of the line-of-sight for which object information is received is not visible to the user from the user position on the axis of the line-of-sight as a result of being obstructed; and
 rendering the descriptions of the objects to the user in a view of the gaze tracking device along the axis of the line-of-sight including a description for the obstructed object.

17. The method of claim 16, wherein the rendering the descriptions of the objects comprises rendering augmented reality representations of the descriptions of the objects in the view of the gaze tracking device displayed along the axis of the line-of-sight.

18. The method of claim 17, further comprising:
 receiving user selection of an augmented reality representation following a first augmented reality representation for the first object along the axis of the line-of-sight; and
 rendering the selected augmented reality representation in the gaze tracking device to appear ahead of the first augmented reality representation along the axis of the line-of-sight in response to receiving the user selection.

19. The method of claim 17, further comprising:
 receiving user input commands to scroll to a selected one of the augmented reality representations along the axis of the line-of-sight other than the first object; and
 rendering the augmented reality representation of the selected augmented reality representation to appear first in the axis of the line-of-sight to provide a visual effect to the user that the selected augmented reality representation is moving forward toward the user and a first augmented reality representation for the first object is moving away from the user.

20. The method of claim 17, wherein the object information includes an image of an object for each of the objects indicated in the object information, further comprising:

detecting eye strain for the user along the axis of the line-of-sight; and in response to detecting the eye strain, performing:
- determining an object the user is viewing in the axis of the line-of-sight;
- determining the image for the object the user is viewing in the object information; and
- superimposing an augmented reality representation using the image for the object the user is viewing over the object the user is viewing to enhance a user view of the object the user is viewing.

\* \* \* \* \*